(12) United States Patent
Ryder et al.

(10) Patent No.: US 8,974,170 B2
(45) Date of Patent: Mar. 10, 2015

(54) POSITION ADJUSTMENT ASSEMBLY FOR AN AGRICULTURAL CONVEYOR

(71) Applicant: CNH Canada, Ltd., Saskatoon (CA)

(72) Inventors: Nicholas G. A. Ryder, Saskatchewan (CA); Trevor L. Kowalchuk, Saskatchewan (CA); Ethan C. S. Bent, Saskatchewan (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 42 days.

(21) Appl. No.: 13/740,578

(22) Filed: Jan. 14, 2013

(65) Prior Publication Data

US 2013/0180831 A1     Jul. 18, 2013

Related U.S. Application Data

(60) Provisional application No. 61/586,921, filed on Jan. 16, 2012.

(51) Int. Cl.
   *B65G 41/00*     (2006.01)
   *A01C 15/00*     (2006.01)

(52) U.S. Cl.
   CPC ............ *B65G 41/002* (2013.01); *A01C 15/003* (2013.01)
   USPC ............................ 414/523; 198/617; 414/327

(58) Field of Classification Search
   CPC ........................................... B65G 41/002
   USPC ................................. 414/327, 523
   See application file for complete search history.

(56) References Cited

U.S. PATENT DOCUMENTS

| | | | |
|---|---|---|---|
| 4,742,938 A | 5/1988 | Niewold | |
| 4,963,066 A | 10/1990 | Boppart | |
| 5,108,249 A | 4/1992 | Kinzebaw et al. | |
| 5,888,044 A * | 3/1999 | Baskerville | 414/523 |
| 7,063,497 B2 | 6/2006 | Mast et al. | |
| 7,267,519 B2 * | 9/2007 | Cresswell et al. | 414/526 |
| 7,296,676 B2 | 11/2007 | Smith et al. | |
| 7,488,149 B2 * | 2/2009 | Waldner | 414/532 |
| 7,500,814 B2 * | 3/2009 | Meyer | 414/327 |
| 7,708,131 B2 | 5/2010 | Muth | |
| 7,946,416 B2 | 5/2011 | Grose et al. | |
| 8,573,917 B2 * | 11/2013 | Renyer | 414/523 |
| 8,794,900 B2 * | 8/2014 | Friggstad et al. | 414/523 |
| 8,801,353 B2 * | 8/2014 | Friggstad et al. | 414/523 |
| 2005/0123385 A1 | 6/2005 | Kirsch | |
| 2010/0012467 A1 | 1/2010 | Coers et al. | |
| 2013/0134012 A1* | 5/2013 | Borkgren | 198/315 |

FOREIGN PATENT DOCUMENTS

| | | |
|---|---|---|
| AU | 2005203121 | 10/2010 |
| CA | 2763319 A1 | 12/2012 |

* cited by examiner

*Primary Examiner* — Gene Crawford
*Assistant Examiner* — Thomas Randazzo
(74) *Attorney, Agent, or Firm* — Rebecca L. Henkel

(57) ABSTRACT

A position adjustment assembly for an agricultural product conveyor, which delivers a product to a storage system, such as an air cart, includes an inner arm having a first end rotatably coupled to the air cart and a second end. An outer arm has a first end and a second end. The second end of the inner arm is rotatably coupled to the outer arm proximate to the first end of the outer arm. An intermediate link has a lateral positioning assembly to vary the length of the intermediate link.

17 Claims, 6 Drawing Sheets

POSITION ADJUSTMENT ASSEMBLY FOR AN AGRICULTURAL CONVEYOR

CROSS-REFERENCE TO RELATED APPLICATION

The present application claims the benefit of U.S. Ser. No. 61/586,921 filed Jan. 16, 2012.

FIELD OF THE INVENTION

The subject matter disclosed herein relates generally to agricultural systems and, in particular, to a position adjustment assembly for an agricultural conveyor.

BACKGROUND OF THE INVENTION

As is known, an air seeder is an agricultural implement that is commonly used to plant a seed crop in a large field. Air seeders typically have centrally located hoppers for seed and fertilizer which distributes the seed or fertilizer via an air stream to individual seed rows. It is convenient to fill and easy to clean out and move. Any crop that can be grown from seeds, which might vary in size from oilseeds to corn, can be sewn by an air seeder.

The seed and fertilizer hoppers are usually carried on a large cart towed behind a tractor or other work vehicle. The air stream is created by a high capacity fan mounted on the cart which blows air through an air dispensing system made up of pipes and/or pneumatic tubes located under the seed and fertilizer tanks. Seed and fertilizer are metered out from the hoppers by a meter wheel that is turning at a rate which is a function of the speed at which the cart is traveling and which is set by the operator for the proper seed rate or seed density. The seeds enter the airstream and follow the pipes or tubes which terminate in the dispenser. Openers pulled through the soil break the soil and create a furrow in which the seeds are placed. The openers may be made of steel in the shape of points, discs, or cultivator shovels. The dispensers are located behind the openers to deposit the seed or fertilizer in the furrow. Once placed in the seed bed, a packer wheel may be pulled over the furrow to pack the soil on top of the deposited seed to retain moisture near the seed and harrow the furrows so the field is not rough.

A typical air seeder has an agricultural commodity cart ("air cart") comprising at least one, and commonly two, three or more tanks for carrying various agricultural products like seed and fertilizer. Although not always present, commonly there is a conveyor mounted on the cart for transferring agricultural product ("commodity") from transport vehicles into the tanks. The conveyor is typically mounted on a pivot mechanism configured to allow it to be moved from a transport position, where the bottom end of the conveyor is raised for transport, to an operating position where the bottom end is lowered to receive a commodity from the transport vehicle. The conveyor may include a hopper at the bottom for receiving the product, a tube with an internal conveyor for moving the product up the tube, and a downspout at the top for discharging the product into each tank. Because an air cart may include multiple tanks having independent openings for receiving product, the tube and downspout may be successively aligned with an opening for each tank to facilitate product flow into the respective tank.

Some conveyors are coupled to the air carts by inner arm and outer arms. Each arm may include an independent actuating cylinder configured to adjust a position of the respective arm relative to the air cart. Unfortunately, coordinating movement of the inner and outer arms to align the downspout with each storage compartment opening may be difficult and time-consuming, thereby increasing the duration associated with loading product into the air cart. Other conveyors are coupled to the air carts by way of a single actuating cylinder and a linkage assembly. The hydraulic cylinder is used to position the downspout of the conveyor to align with different openings of the tanks while the linkage assembly is configured to maintain the hopper at a fixed location with respect to the air cart. Although providing more intuitive operation once the hopper is in position under the transport vehicle, this embodiment requires more precise alignment between the air cart and the transport vehicle.

SUMMARY OF THE INVENTION

According to one embodiment of the present invention, a method of delivering product to an air cart from a supply vehicle via an agricultural product conveyor includes the steps of controlling a first positioning assembly to adjust a lateral position of the product conveyor with respect to the air cart and controlling a second positioning assembly to adjust a longitudinal position of the product conveyor with respect to the air cart. The lateral position of the product conveyor with respect to the air cart may be adjusted by controlling a first linear actuator to rotate an inner arm relative to the air cart and a second linear actuator to vary a length of the intermediate link. The longitudinal position of the product conveyor with respect to the air cart may be adjusted by an intermediate link and rotation control assembly adjusting the angle between the inner arm and an outer arm. The intermediate link may be operatively connected to the inner arm, thereby adjusting the angle in tandem with controlling the first linear actuator.

According to another embodiment of the invention, a position adjustment assembly for an agricultural product conveyor, which delivers a product to a storage system, such as an air cart, includes an inner arm, having a first end rotatably coupled to the air cart, and a second end. The position adjustment assembly also includes an outer arm having a first end a second end and an intermediate link having a lateral positioning assembly to vary the length of the intermediate link. The second end of the inner arm is rotatably coupled to the outer arm proximate to the first end of the outer arm, and the intermediate link is mounted generally parallel to the inner arm.

According to still another embodiment of the invention, a position adjustment assembly for orienting an agricultural product conveyor with respect to a frame and with respect to an air cart mounted on the frame includes an inner arm having a first end and a second end. The first end of the inner arm is configured to rotatably couple to the frame. The position adjustment assembly also includes an outer arm having a first end, a second end, and a pivot positioned between the first end and the second end. A second end of the inner arm is rotatably coupled to the pivot of the outer arm, and the product conveyor is rotatably coupled to the second end of the outer arm. The position adjustment assembly further includes an intermediate link having a first end, a second end, a length, and a lateral positioning assembly. The first end is configured to be coupled proximate to the frame, the second end is rotatably coupled to the first end of the outer arm, and the lateral positioning assembly varies the length of the intermediate link.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION

Figure 1:
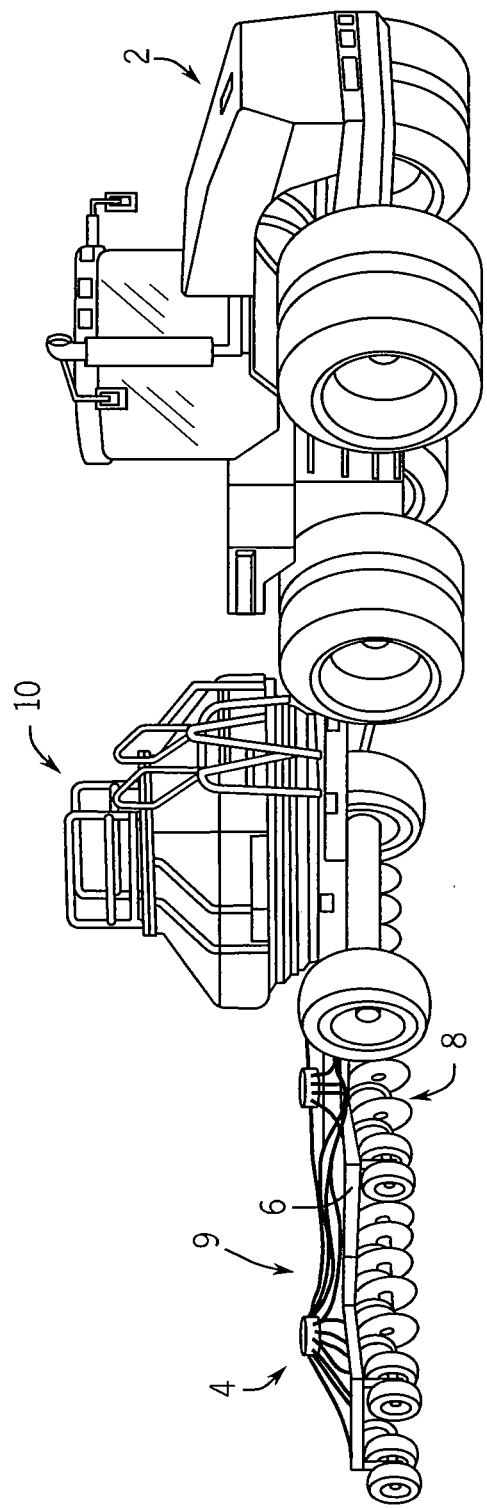
FIG. 1 is a pictorial view of an agricultural system generally comprised of tractor, a seeding system, and a planter having a set of disc openers.

Referring to FIG. 1, an agricultural seeding system 10 is shown and, as known in the art, is generally comprised of a tractor 2, a seeding system 10, and a planter 4. The seeding system 10 and the planter 4 are hitched to the tractor 2 in a conventional manner. The planter 4 includes a tool bar 6 to which a set of opener units 8 are coupled. The disc opener units 8 are designed to cut a furrow into the soil. The seeding system 10 pneumatically delivers seed and/or fertilizer via a set of delivery tubes 9 whereupon the seed and/or fertilizer is deposited into the furrows cut by the opener units 8.

Figure 2:
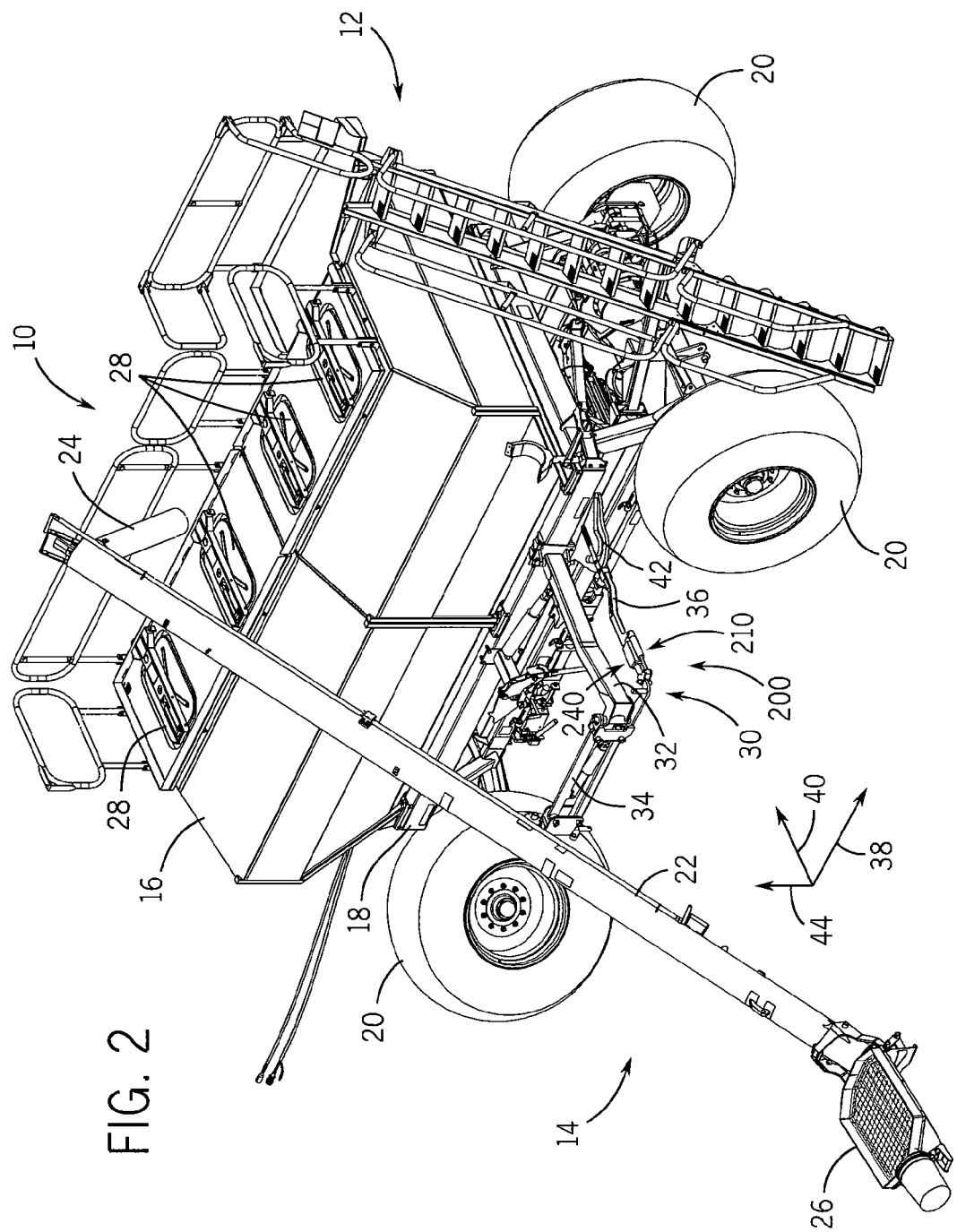
FIG. 2 is a perspective view of the seeding system of FIG. 1 having a conveyor for moving product.

Referring next to FIG. 2, the seeding system 10 includes a storage system, such as the illustrated air cart 12 and a product conveyor 14 for moving product from an external source to the air cart 12. The air cart 12 includes one or more storage compartments 16 (e.g., holding containers), a frame 18, and wheels 20. The frame 18 includes a towing hitch configured to couple the air cart 12 to an implement or tow vehicle. In certain configurations, the storage compartments 16 may be used for storing various agricultural products. For example, the storage compartments 16 may be used to store seeds or a dry fertilizer. Optionally, one compartment may include seeds and another compartment may include a dry fertilizer. Consequently, the air cart 12 may be configured to deliver seeds and fertilizer separately or in a single pass.

The product within the storage compartments 16 may be gravity fed into metering systems. The metering systems may include meter rollers to regulate the flow of product from the storage compartments 16 into an air flow provided by an air source. The air flow carries the product through one or more delivery tubes 9 to an implement, such as the planter 4 of FIG. 1, thereby supplying the product for deposition into the soil.

In the illustrated embodiment, the product conveyor 14 includes a product transporting tube 22, a downspout 24 coupled to one end of the product transporting tube 22, and a hopper 26 coupled to the other end of the product transporting tube 22. The conveyor 14 is configured to move agricultural product from the hopper 26, through the product transporting tube 22 and downspout 24, and into the storage compartments 16. As will be appreciated, the product may be introduced into the hopper 26 from a product transporting vehicle, such as an end-dump truck or a belly-dump truck.

During loading operations, a product transporting vehicle delivers the agricultural product into the hopper 26 (e.g., via an outlet in a bottom portion of a trailer). The hopper 26 then transfers the product to the product transporting tube 22. For example, an auger in the hopper 26 may rotate to move the product to the product transporting tube 22. The product transporting tube 22 may also include an auger configured to receive product from the hopper 26 and to move the product to the downspout 24, which directs the product into the storage compartments 16. In certain embodiments, the transporting tube auger is coupled to the hopper auger such that rotation of the transporting tube auger drives the hopper auger to rotate. In alternative embodiments, the hopper 26 may include a belt system configured to transfer product from the hopper 26 to the product transporting tube 22. Further, the product transporting tube 22 may include another belt system that interfaces with the belt system of the hopper 26. The transporting tube belt system is configured to move the product from the hopper 26 to the downspout 24, which directs the product into the storage compartments 16.

In the illustrated embodiment, the air cart 12 includes four storage compartments 16, each having an independent opening 28 for receiving product. In this configuration, the downspout 24 of the conveyor 14 may be successively aligned with each opening 28 to facilitate product flow into the respective storage compartment 16. To facilitate movement of the conveyor 14 relative to the air cart 12, the seeding system 10 includes a position adjustment assembly 30. In the illustrated embodiment, the position adjustment assembly 30 includes an inner arm 32, an outer arm 34, and an intermediate link 36. As discussed in detail below, an actuator extending between the frame 18 of the air cart 12 and the inner arm 32 is configured to drive the inner arm 32 to rotate relative to the air cart 12. The intermediate link 36 is configured to induce the outer arm 34 to rotate upon rotation of the inner arm 32 to automatically control a position of a distal end of the outer arm 34. For example, in certain embodiments, the position adjustment assembly 30 is configured to move the distal end of the outer arm 34 along a longitudinal axis 38, while maintaining the distal end at a substantially constant distance from the air cart 12 along a lateral axis 40. In this configuration, the position adjustment assembly 30 may align the downspout 24 with each successive storage compartment opening 28 via adjustment of a single actuator. As a result, the duration associated with filling the air cart 12 with product may be substantially reduced compared to configurations that employ independently controllable inner and outer arms.

In the illustrated embodiment, the intermediate link 36 includes a lateral positioning assembly 200. The lateral positioning assembly 200 includes an actuator to increase or decrease the length of the intermediate link 36. While a hydraulic cylinder 216 is utilized as the actuator in the illustrated embodiment, it should be appreciated that alternative linear actuators (e.g., screw drives, electromechanical actuators, etc.) may be employed in alternative embodiments. Although the illustrated embodiment shows a remotely actuated hydraulic cylinder 216, it is further contemplated that a hydraulic block with hoses in communication with each end of the cylinder may be used to extend or retract the hydraulic cylinder 216. As the hydraulic cylinder 216 is extended or retracted, a telescoping assembly 240 in the intermediate link 36 similarly extends or retracts. Extending the hydraulic cylinder 216 and, consequently, extending the intermediate link 36 induces rotation of the outer arm 34 in a direction 94 about the rotational axis 128 and reduces the lateral distance 96 between the second end 60 of the outer arm 34 and the air cart 12. Retracting the hydraulic cylinder 216 and, consequently, retracting the intermediate link 36 induces rotation of the outer arm 34 in a direction 104 about the rotational axis 128 and increases the lateral distance 96 between the second end 60 of the outer arm 34 and the air cart 12. Thus, the lateral positioning assembly 200 is used to adjust the lateral distance of the conveyor 14 relative to the air cart 12, and the lateral positioning assembly 200 may, for example, facilitate aligning the hopper 26 with the outlet of a belly-dump truck.

In certain embodiments, the position adjustment assembly 30 includes a rotation control assembly 42 configured to induce the intermediate link 36 to drive the outer arm 34 to rotate upon rotation of the inner arm 32. For example, the rotation control assembly 42 may include a cam, and the intermediate link may include a follower configured to engage the cam. In such a configuration, contact between the cam and the follower drives the intermediate link 36 to move along the lateral axis 40 relative to the air cart 12 to facilitate rotation of the outer arm 34. For example, the cam may be shaped such that a lateral distance between the distal end of the outer arm 34 and the air cart 12 remains substantially constant as the distal end is driven to move along the longitudinal axis 38. In further embodiments, the outer arm 34 may include a height adjustment assembly configured to adjust a position of the conveyor 14 along a vertical axis 44 to facilitate alignment of the hopper 26 with the transporting vehicle, and/or to facilitate alignment of the downspout 24 with the openings 28.

Figure 3:
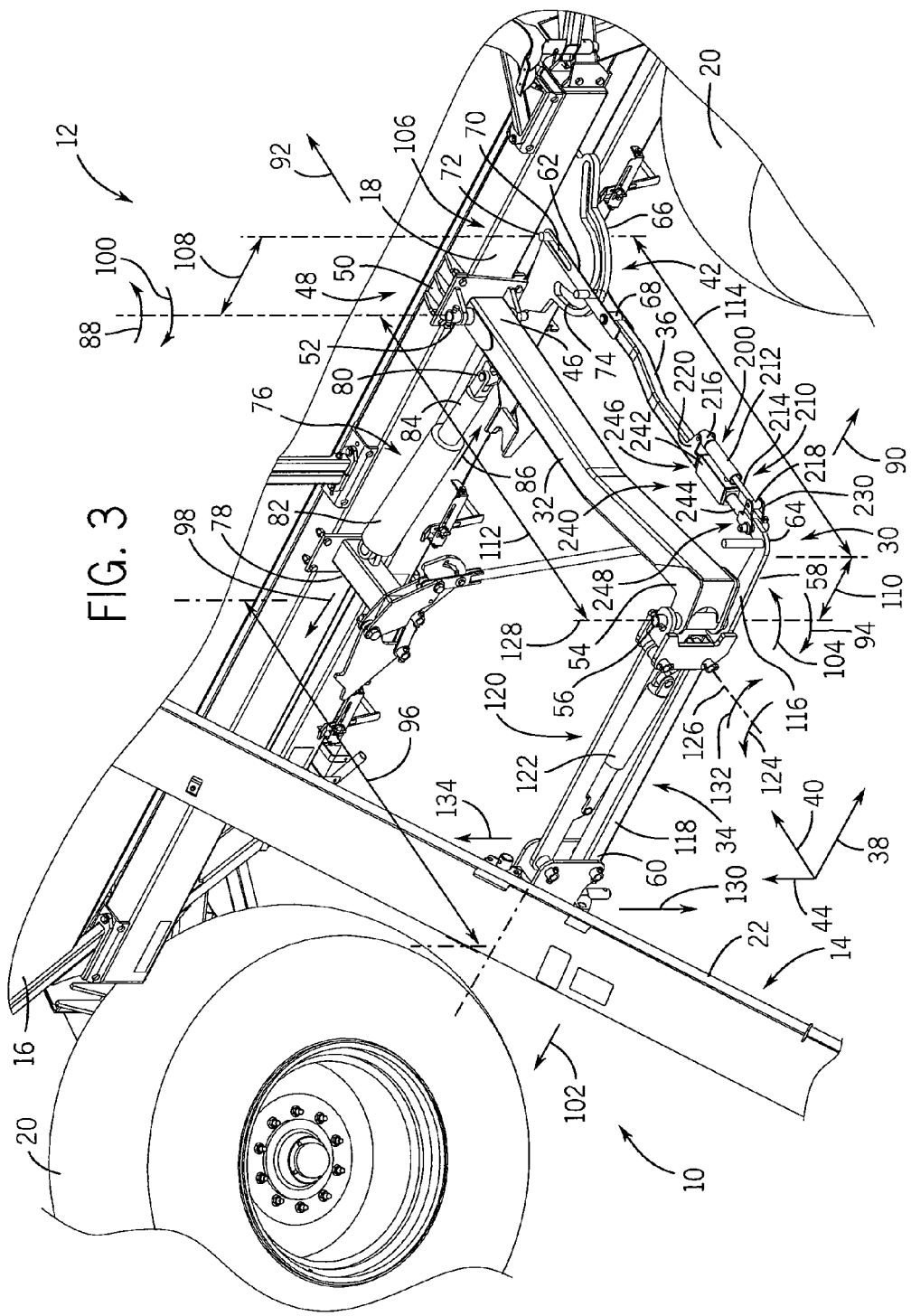
FIG. 3 is a detailed perspective view of an embodiment of a position adjustment assembly that may be employed to adjust a position of the conveyor relative to the air cart of FIG. 2.

FIG. 3 is a detailed perspective view of an embodiment of a position adjustment assembly 30 that may be employed to adjust a position of the conveyor 14 relative to the air cart 12. As previously discussed, the position adjustment assembly 30 is configured to move the conveyor 14 along the longitudinal axis 38 such that the downspout 24 successively aligns with each storage compartment opening 28. As illustrated, a first end 46 of the inner arm 30 is rotatably coupled to the frame 18 of the air cart 12 at a first location 48. For example, in the illustrated embodiment, the position adjustment assembly 30 includes a mounting bracket 50 secured to the frame 18, and a pivot 52 configured to rotatably couple the first end 46 of the inner arm 32 to the mounting bracket 50. Furthermore, a second end 54 of the inner arm 32 is rotatably coupled to the outer arm 34 by a pivot 56. As illustrated, the pivot 56 is positioned between a first end 58 of the outer arm 34, and a second end 60 of the outer arm 34. The transporting tube 22 of the conveyor 14 is rotatably coupled to the second end 60 of the outer arm 34 to facilitate adjustment of an orientation of the conveyor 14 relative to the air cart 12. In the illustrated embodiment, the conveyor 14 is supported by the inner arm 32 and the outer arm 34, i.e., the arms 32 and 34 are configured to transfer the vertical load of the conveyor 14 to the frame 18 of the air cart 12. The arms 32 and 34 are also configured to facilitate position adjustment of the conveyor 14 relative to the air cart 12.

In the illustrated embodiment, the intermediate link 36 extends between the rotation control assembly 42 and the first end 58 of the outer arm 34. Specifically, a first end 62 of the intermediate link 36 is engaged with the rotation control assembly 42, and a second end 64 of the intermediate link 36 is rotatably coupled to the first end 58 of the outer arm 34. As illustrated, the rotation control assembly 42 includes a cam 66, and the intermediate link 36 includes a follower 68. In this configuration, rotation of the inner arm 32 drives the follower 68 to move along the cam 66, thereby adjusting a lateral position of the first end 62 of the intermediate link 36. As a result, the intermediate link 36 drives the outer arm 34 to rotate about the pivot 56 upon rotation of the inner arm 32. For example, the cam 66 may be shaped such that a lateral distance between the second end 60 of the outer arm 34 and the air cart 12 remains substantially constant as the inner arm 32 rotates. In the illustrated embodiment, the intermediate link 36 includes a slot 70 configured to engage a pin 72 of the rotation control assembly 42, thereby securing the intermediate link 36 to the rotation control assembly 42. In addition, the illustrated rotation control assembly 42 includes a slot 74 configured to receive a pin of the intermediate link 36. In certain embodiments, contact between the pin and the slot 74 induces lateral movement of the intermediate link 36, either alone or in combination with the cam 66 and follower 68.

In the illustrated embodiment, the position adjustment assembly 30 includes a hydraulic cylinder 76 configured to rotate the inner arm 32 relative to the air cart 12. As illustrated, the hydraulic cylinder 76 includes a first end 78 rotatably coupled to the frame 18 of the air cart 12, and a second end 80 rotatably coupled to the inner arm 32. The hydraulic cylinder 76 includes a barrel 82, and a piston rod 84 configured to extend and retract relative to the barrel 82 to drive the inner arm 32 to rotate. While a hydraulic cylinder 76 is utilized in the illustrated embodiment, it should be appreciated that alternative linear actuators (e.g., screw drives, electromechanical actuators, etc.) may be employed in alternative embodiments. In further embodiments, a rotatory actuator (e.g., hydraulic, electrical, etc.) may be directly coupled to the pivot 52 to drive the inner arm 32 to rotate.

In the illustrated embodiment, extension of the piston rod 84 in the direction 86 drives the inner arm 32 to rotate in the direction 88. As the inner arm 32 rotates, the second end 54 of the inner arm 32 moves in the direction 90, thereby translating the conveyor 14 along the longitudinal axis 38 in the direction 90. In addition, movement of the second end 54 of the inner arm 32 induces the intermediate link 36 to move in the direction 90, thereby driving the follower 68 along the cam 66. Due to the shape of the cam 66, the first end 62 of the intermediate link 36 is driven to move along the lateral axis 40. For example, movement of the follower 68 away from the apex of the cam 66 induces the first end 62 of the intermediate link 36 to move in the direction 92. As discussed in detail below, movement of the intermediate link 36 in the direction 92 and movement of the outer arm 34 in the direction 90 induces the outer arm 34 to rotate about the pivot 56 in the direction 94. In this configuration, the cam 66 may be shaped such that a lateral distance 96 between the second end 60 of the outer arm 34 and the air cart 12 is precisely controlled. For example, the distance 96 may remain substantially constant as the inner arm 32 rotates in the direction 88. As a result, the conveyor 14 may be positioned to facilitate alignment of the downspout 24 with each successive storage compartment opening 28 via adjustment of the hydraulic cylinder 76.

Conversely, retraction of the piston rod 84 in the direction 98 drives the inner arm 32 to rotate in the direction 100. As the inner arm 32 rotates, the second end 54 of the inner arm 32 moves in the direction 102, thereby translating the conveyor 14 along the longitudinal axis 38 in the direction 102. In addition, movement of the second end 54 of the inner arm 32 induces the intermediate link 36 to move in the direction 102, thereby driving the follower 68 along the cam 66. Due to the shape of the cam 66, the first end 62 of the intermediate link 36 is driven to move along the lateral axis 40. For example, movement of the follower 68 away from the apex of the cam 66 induces the first end 62 of the intermediate link 36 to move in the direction 92. As discussed in detail below, movement of the intermediate link 36 in the direction 92 and movement of the outer arm 34 in the direction 102 induces the outer arm 34 to rotate about the pivot 56 in the direction 104. In this configuration, the cam 66 may be shaped such that the lateral distance 96 between the second end 60 of the outer arm 34 and the air cart 12 is precisely controlled. For example, the distance 96 may remain substantially constant as the inner arm 32 rotates in the direction 100. As a result, the conveyor 14 may be positioned to facilitate alignment of the downspout 24 with each successive storage compartment opening 28 via adjustment of the hydraulic cylinder 76.

In alternative embodiments, the intermediate link 36 may be rotatably coupled directly to the frame 18 of the air cart 18, or to a support coupled to the mounting bracket 50. For example, in certain embodiments, the first end 62 of the intermediate link 36 is rotatably coupled to the air cart 12 at a second location 106, longitudinally offset from the first location 48. In this configuration, the intermediate link 36 drives the outer arm 34 to rotate about the pivot 56 in a first direction (e.g., the direction 94) upon rotation of the inner arm 32 in a second direction (e.g., the direction 88), opposite the first direction, such that the lateral distance 96 between the second end 60 of the outer arm 34 and the air cart 12 remains substantially constant. However, it should be appreciated that embodiments employing the rotation control assembly 42 may provide enhanced control of the conveyor 14 because the contour of the cam 66 may be particularly selected to achieve a desired relationship between rotation of the inner arm 32 and position of the second end 60 of the outer arm 34.

Furthermore, it should be appreciated that the geometry of the position adjustment assembly components may be particularly selected to establish a desired relationship between rotation of the inner arm 32 and position of the second end 60 of the outer arm 34. For example, in certain embodiments, a distance 108 between the first location 48 (i.e., the longitudinal position of the mounting bracket 50) and the second location 106 (e.g., the longitudinal position of the apex of the cam 66) may be substantially equal to a distance 110 between the first end 58 of the outer arm 34 and the pivot 56. In addition, a length 112 of the inner arm 32 may be substantially equal to a length 114 of the intermediate link 36. However, it should be appreciated that the lengths 112 and 114, and the distances 108 and 110 may be particularly adjusted to establish a desired relationship between rotation of the inner arm 32 and position of the second end 60 of the outer arm 34. For example, the geometry of the position adjustment assembly 30 may be configured to maintain the second end 60 of the outer arm 34 at a substantially constant lateral distance 96 from the air cart 12 upon rotation of the inner arm 32 relative to the air cart 12.

Figure 4:
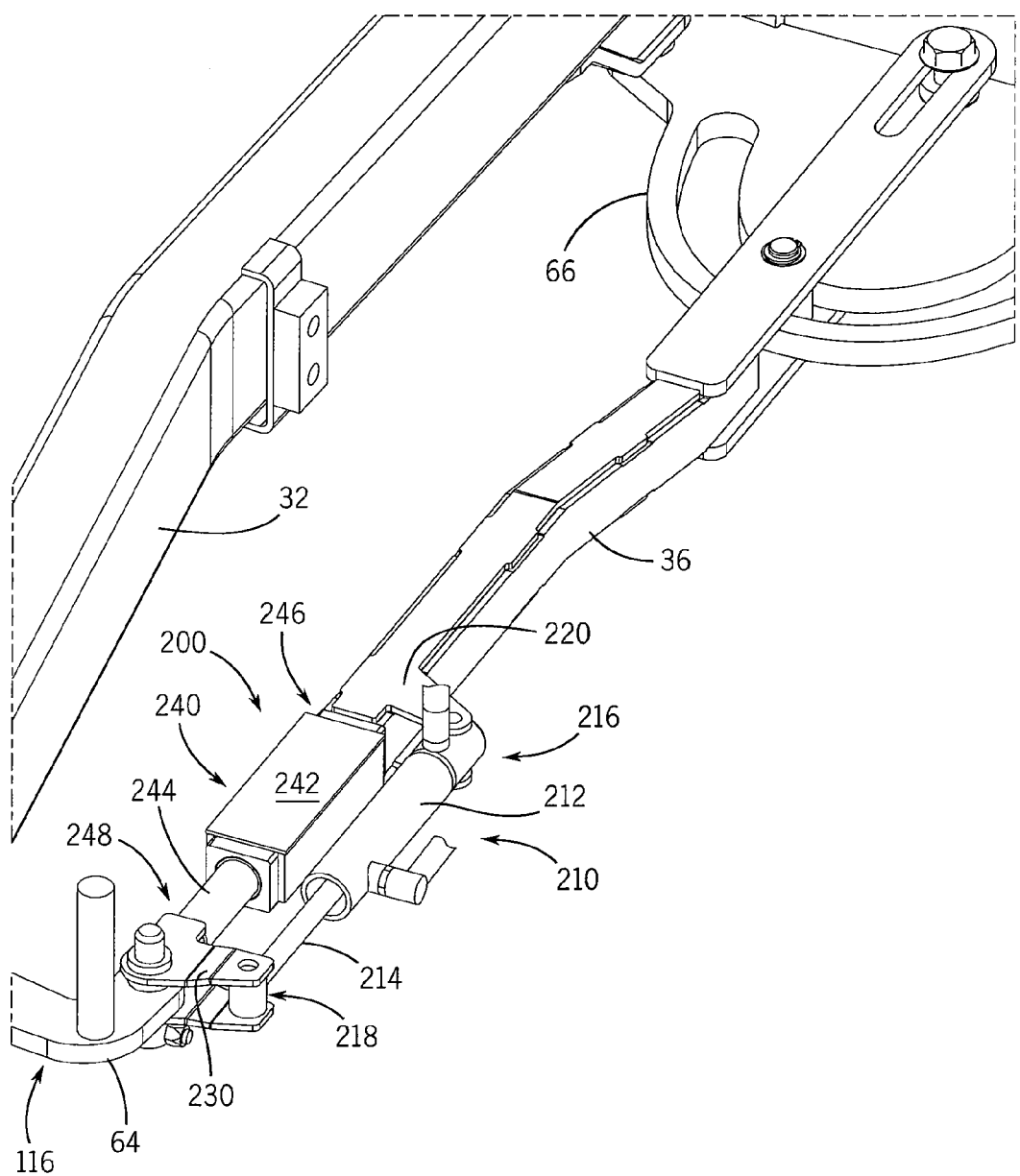
FIG. 4 is a photograph of an embodiment of a position adjustment assembly incorporating the present invention.

As previously discussed, the lateral positioning assembly 200 adjusts the position of the conveyor 14 relative to the air cart 12 along the lateral axis 40. Referring also to FIG. 4, the lateral positioning assembly is mounted along the intermediate link 36 and includes a hydraulic cylinder 210 and a telescoping member 240. The hydraulic cylinder 210 includes a first end 216 coupled to a first mounting bracket 220 and a second end 218 coupled to a second mounting bracket 230. The hydraulic cylinder 210 includes a barrel 212, and a piston rod 214, configured to extend and retract relative to the barrel 212, to increase and decrease the length of the intermediate link 36. The telescoping member 240 similarly includes a first end 246 coupled to the first mounting bracket 220 and a second end 248 coupled to the second mounting bracket 230.

The telescoping member 240 includes a sleeve 242, and a telescoping rod 244, configured to extend and retract relative to the sleeve 242 as the hydraulic cylinder 210 extends and retracts. According to this embodiment, the telescoping member 240 provides rigidity with respect to the longitudinal axis 38, resisting bending of the intermediate link along the longitudinal axis 38 as a result of rotational forces applied by movement of other members in the conveyor 14, for example, the inner arm 32 or the outer arm 34. Optionally, the hydraulic cylinder 210 may be enclosed within the telescoping member 240 or the hydraulic cylinder 210 and the telescoping member 240 may be integrally formed as a single device capable of withstanding the rotational forces to resist bending of the lateral positioning assembly 200 along the longitudinal axis 38.

Extension of the hydraulic cylinder 210 causes the distance between the conveyor 14 and the air cart 12 to decrease. As the piston rod 214 extends from the barrel 212 of the hydraulic cylinder 210, the second end 218 of the hydraulic cylinder 210 moves away from the air cart 12 along the lateral axis 40. As the second end 218 of the hydraulic cylinder 210 moves away from the air cart 12, the first end 58 of the outer arm 34, being coupled to the hydraulic cylinder 210 via the second mounting bracket 230, also moves away from the air cart 12. As the first end 58 of the outer arm 34 moves away from the air cart 12, the outer arm 34 rotates in the direction 94 about the pivot 56, causing the second end 60 of the outer arm 34 to move toward the air cart 12. The conveyor 14, being connected proximate to the second end 60 of the outer arm 34, is thereby also moved toward the air cart 12 as the hydraulic cylinder 210 extends.

Conversely, retraction of the hydraulic cylinder 210 causes the distance between the conveyor 14 and the air cart 12 to increase. As the piston rod 214 retracts into the barrel 212 of the hydraulic cylinder 210, the second end 218 of the hydraulic cylinder 210 moves toward the air cart 12 along the lateral axis 40. As the second end 218 of the hydraulic cylinder 210 moves toward the air cart 12, the first end 58 of the outer arm 34, being coupled to the hydraulic cylinder 210 via the second mounting bracket 230, also moves toward the air cart 12. As the first end 58 of the outer arm 34 moves toward the air cart 12, the outer arm 34 rotates in the direction 104 about the pivot 56, causing the second end 60 of the outer arm 34 to move away from the air cart 12. The conveyor 14, being connected proximate to the second end 60 of the outer arm 34, is thereby also moved away from the air cart 12 as the hydraulic cylinder 210 retracts. In this manner, the conveyor 14 may be moved closer to or away from the air cart 12 to facilitate alignment of the hopper 26, for example, with respect to an outlet of the dump truck 136.

In the illustrated embodiment, the outer arm 34 is configured to adjust a height of the conveyor 14 relative to the air cart 12. As illustrated, the outer arm 34 includes a first member 116 extending between the first end 58 and the pivot 56. The outer arm 34 also includes a second member 118 rotatably coupled to the first member 116 adjacent to the pivot 56, and extending to the second end 60 of the outer arm 34. In the illustrated embodiment, the second member 118 is an element of a parallel linkage assembly 120 extending between the pivot 56 and the second end 60 of the outer arm 34. However, it should be appreciated that a single member may extend between the pivot 56 and the second end 60 in alternative embodiments. As illustrated, an actuator 122 is coupled to the parallel linkage assembly 120, and configured to adjust a height of the conveyor 14. For example, the actuator 122 may rotate the second member 118 in a downward direction 124 about an axis 126 substantially perpendicular to a rotational axis 128 of the pivot 56, thereby inducing the conveyor 14 to move in a downward direction 130 along the vertical axis 44. Conversely, the actuator 122 may rotate the second member 118 in an upward direction 132, thereby driving the conveyor 14 to move in an upward direction 134 along the vertical axis 44. In this manner, the height of the conveyor 14 may be particularly adjusted to facilitate alignment between the downspout 24 and the storage compartment openings 28.

Figure 5:
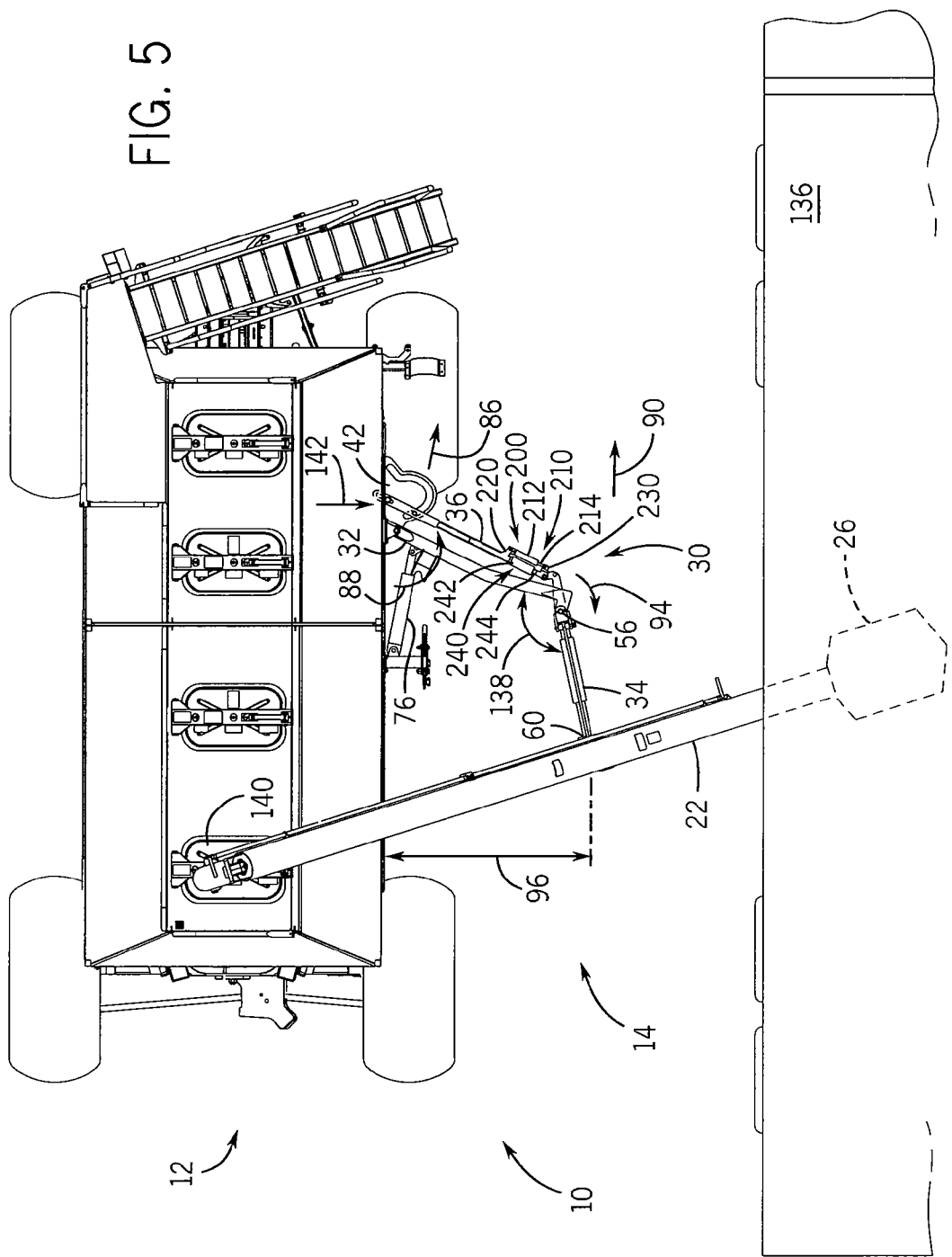
FIG. 5 is a top view of the position adjustment assembly of FIG. 3, in which the conveyor is aligned with a first storage compartment opening.

FIG. 5 is a top view of the position adjustment assembly 30, in which the conveyor 14 is aligned with a first storage compartment opening 140. In the illustrated embodiment, a belly-dump truck 136 is positioned adjacent to the air cart 12, thereby enabling the conveyor 14 to transfer product from the truck 136 to the air cart 12. As illustrated, the hydraulic cylinder 76 is in a substantially retracted position, thereby establishing an angle 138 between the inner arm 32 and the outer arm 34. Lateral positioning assembly 200 is shown in at least a partially extended state to facilitate aligning the hopper 26 at a desired distance under the truck 136, corresponding to an outlet of the truck 136. Due to the geometry of the position adjustment assembly components, the second end 60 of the outer arm 34 is positioned to facilitate alignment of the conveyor 14 with a first storage compartment opening 140. Consequently, product may flow from the truck outlet to the hopper 26, through the transporting tube 22, and into the first storage compartment opening 140.

Once a desired quantity of product has been delivered to the first storage compartment, the conveyor 14 may be aligned with a successive storage compartment opening. For example, extension of the hydraulic cylinder 76 in the direction 86 drives the inner arm 32 to rotate in the direction 88. As the inner arm 32 rotates, the outer arm 34, the conveyor 14 and the intermediate link 36 are driven in the direction 90. Due to the shape of the rotation control assembly 42, movement of the intermediate link 36 in the direction 90 induces lateral movement of the intermediate link 36 in the direction 142, thereby driving the outer arm 34 to rotate about the pivot 56 in the direction 94. As a result, a distance 96 between the second end 60 of the outer arm 34 and the air cart 12 remains substantially constant as the inner arm 32 rotates in the direction 88. Consequently, the conveyor 14 may be translated in the direction 90 while maintaining a desired distance from the air cart 12, thereby facilitating alignment of the conveyor 14 with a successive storage compartment opening. Because the conveyor 14 may be positioned to successively fill each storage compartment 16 via adjustment of a single actuator, the duration associated with filling the air cart 12 with product may be substantially reduced, as compared to configurations that employ independently controllable inner and outer arms.

Figure 6:
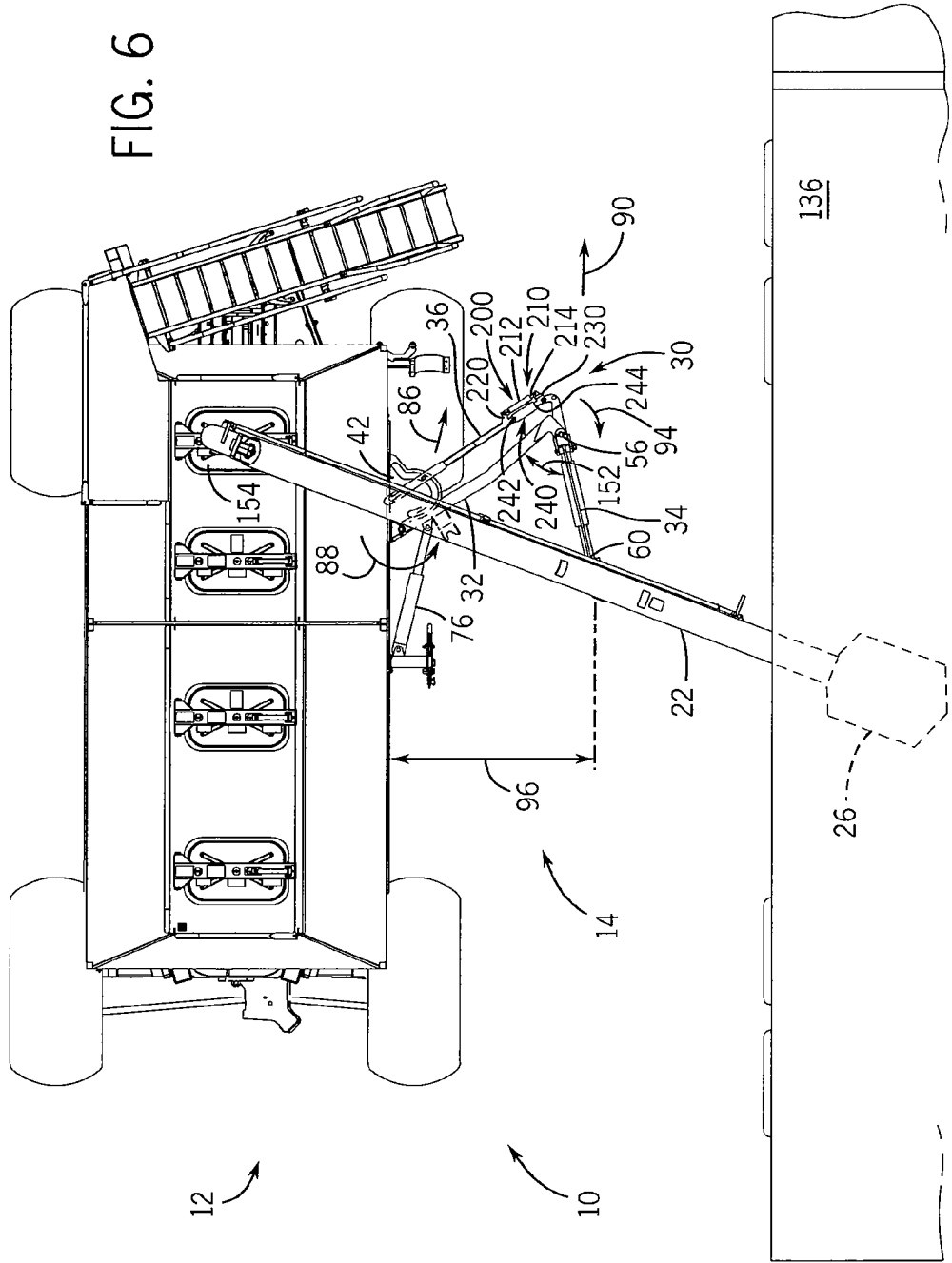
FIG. 6 is a top view of the position adjustment assembly of FIG. 3, in which the conveyor is aligned with a second storage compartment opening.

FIG. 6 is a top view of the position adjustment assembly 30, in which the conveyor 14 is aligned with a fourth storage compartment opening. As illustrated, the hydraulic cylinder 76 is extended relative to the position shown in FIG. 5, thereby rotating the inner arm 32 in the direction 88, and establishing an angle 152 between the inner arm 32 and the outer arm 34. In the illustrated embodiment, the angle 152 is less than the angle 138 shown in FIG. 5. As a result, the second end 60 of the outer arm 34 is positioned to facilitate alignment of the conveyor 14 with a fourth storage compartment opening 154. In addition, the hopper 26 remains aligned with an outlet of the truck 136. Consequently, product may flow from the truck outlet to the hopper 26, through the transporting tube 22, and into the second storage compartment opening 146. Because the position adjustment assembly 30 is configured to maintain a substantially constant distance 96 between the second end 60 of the outer arm 34 and the air cart 12, the conveyor 14 may be aligned with each storage compartment via adjustment of a single actuator, thereby substantially simplifying control of the conveyor 14.

Many changes and modifications could be made to the invention without departing from the spirit thereof. The scope of these changes will become apparent from the appended claims.

We claim:

1. A position adjustment assembly for an agricultural product conveyor, which delivers a product to a storage system, such as an air cart, comprising:
   an inner arm having a first end rotatably coupled to the air cart and second end spaced from the agricultural product conveyor;
   an outer arm having a first end spaced from the agricultural product conveyor and rotatably coupled to the second end of the inner arm at a pivot point and a second end rotatably coupled to the agricultural product conveyor; and
   an intermediate link having a first end operatively connected to the air cart for guiding movement thereof, a second end operatively connected to the outer arm, and a length, the intermediate link further including a lateral positioning assembly to vary the length of the intermediate link;
   wherein the outer arm rotates with respect to the second end of the inner arm about the pivot point in response to the lateral positioning assembly varying the length of the intermediate link.

2. The position adjustment assembly of claim 1 wherein the lateral positioning assembly includes a linear actuator and a telescoping member.

3. The positioning adjustment assembly of claim 2 wherein the linear actuator is a hydraulic cylinder.

4. The positioning adjustment assembly of claim 3 wherein:
   the hydraulic cylinder has a first end and a second end;
   the telescoping member has a first end and a second end;
   the intermediate link, further includes a first mounting member and a second member;
   the first end of the hydraulic cylinder and the first end of the telescoping member are mounted to the first mounting member; and
   the second end of the hydraulic cylinder and the second end of the telescoping member are mounted to the second mounting member.

5. The positioning adjustment assembly of claim 2 wherein the linear actuator and the telescoping member are integrally formed as a single device.

6. A position adjustment assembly for orienting an agricultural product conveyor with respect to a frame and with respect to an air cart mounted on the frame, the position adjustment assembly comprising:
   an inner arm having a first end and a second end, the first end of the inner arm configured to be rotatably coupled to the frame;
   an outer arm having a first end, a second end, and a pivot positioned between the first end and the second end, wherein:
      a second end of the inner arm is rotatably coupled to the pivot of the outer arm, and
      the product conveyor is rotatably coupled to the second end of the outer arm;
   an intermediate link having a first end, a second end, a length, and a lateral positioning assembly, wherein:
      the first end of the intermediate link is configured to be coupled proximate to the frame for guiding the movement thereof, the second end of the intermediate link is rotatably coupled to the first end of the outer arm, and
the lateral positioning assembly varies the length of the intermediate link.

7. The position adjustment assembly of claim 6 wherein the lateral positioning assembly includes a linear actuator and a telescoping member.

8. The positioning adjustment assembly of claim 7 wherein the linear actuator is a hydraulic cylinder.

9. The positioning adjustment assembly of claim 6 wherein the intermediate link is mounted generally parallel to the inner arm.

10. The positioning adjustment assembly of claim 9 wherein the second end of the outer arm is configured to rotate about the pivot of the outer arm responsive to the lateral positioning assembly varying the length of the intermediate link.

11. The positioning adjustment assembly of claim 10 wherein the second end of the outer arm is configured to move towards the frame as the lateral positioning assembly increases the length of the intermediate link and the second end of the outer arm is configured to move away from the frame as the lateral positioning assembly decreases the length of the intermediate link.

12. The positioning adjustment assembly of claim 11 wherein a bracket is arranged between the second ends of the outer arm and the intermediate link for connecting the second ends of the outer arm and the intermediate link to each other.

13. The positioning adjustment assembly of claim 12 wherein the outer arm includes a first member and a second member arranged on opposite sides of the pivot of the outer arm such that the first and second members rotate in opposite directions during rotation of the outer arm about the pivot of the outer arm.

14. The positioning adjustment assembly of claim 13 wherein, the bracket connects the second end of the intermediate link to the first member of the outer arm.

15. A method of delivering product to an air cart from a supply vehicle via an agricultural product conveyor, comprising the steps of:
pivotably connecting a first end of an inner arm to the air cart:
pivotably connecting a second end of the inner arm to an outer arm:
pivotably connecting a second end of the outer arm to the product conveyor;
connecting a cam to the arm cart;
positioning a follower on a first end of an intermediate link in the cam and connecting a second end of the intermediate link to a first end of the outer arm;
adjusting a position of the product conveyor with respect to the air cart according to the steps of:
controlling a first linear actuator to rotate an inner arm relative to the air cart; and
controlling a second linear actuator to vary a length of an intermediate link,
wherein:
the follower of the intermediate link follows the cam in response to rotation of the inner arm relative the cart, and
an angle between the inner arm and an outer arm is adjusted in resonse to the varying of the length of the intermediate link.

16. The method of claim 15 wherein the first and the second linear actuators are hydraulic cylinders.

17. The method of claim 15 further comprising arranging a pivot between a first end and a second end of the outer arm, wherein the second linear actuator moves the first end of the outer arm and in a a first direction relative to the air cart and the second end of the outer arm and in a second, opposite, direction relative to the air cart for positioning of the product conveyor relative to the air cart.

* * * * *